(12) United States Patent
Riley et al.

(10) Patent No.: US 6,544,689 B1
(45) Date of Patent: Apr. 8, 2003

(54) COMPOSITE ELECTROLYTES BASED ON SMECTITE CLAYS AND HIGH DIELECTRIC ORGANIC LIQUIDS AND ELECTRODES

(75) Inventors: Michael W. Riley, Raleigh, NC (US); Peter S. Fedkiw, Raleigh, NC (US); Saad A. Khan, Cary, NC (US); Barrie Davies, Waxhaw, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/606,716

(22) Filed: Jun. 29, 2000

Related U.S. Application Data
(60) Provisional application No. 60/141,697, filed on Jun. 30, 1999, and provisional application No. 60/159,671, filed on Oct. 15, 1999.

(51) Int. Cl.[7] ............................................. H01M 6/18
(52) U.S. Cl. ..................... 429/302; 429/304; 252/62.2
(58) Field of Search ............................... 429/300, 302, 429/319, 320, 304; 252/62.2

(56) References Cited

U.S. PATENT DOCUMENTS

| | | | |
|---|---|---|---|
| 3,709,737 A | 1/1973 | Fujimoto et al. | 136/148 |
| 3,776,779 A | 12/1973 | Johnson | 136/157 |
| 4,007,122 A | 2/1977 | Owens et al. | 252/62.2 |
| 4,317,872 A | 3/1982 | Varma | 429/190 |
| 4,925,752 A | 5/1990 | Fauteux et al. | 429/191 |

(List continued on next page.)

FOREIGN PATENT DOCUMENTS

| | | | |
|---|---|---|---|
| EP | 505230 | 9/1992 | |
| EP | 0581296 A2 | 2/1994 | H01B/1/12 |
| EP | 666607 | 1/1996 | |
| FR | 2582662 | 12/1986 | C09K/3/00 |
| JP | 56110606 | 9/1981 | A61K/6/02 |
| JP | 04245170 | 9/1992 | C08K/9/00 |
| JP | 06032863 | 2/1994 | |
| JP | 06140052 | 5/1994 | |
| JP | 08064028 | 3/1996 | |
| JP | 08209028 | 8/1996 | C09D/4/02 |

(List continued on next page.)

OTHER PUBLICATIONS

Revised by Richard J. Lewis, Sr., Hawley's Condensed Chemical Dictionary, Thirteenth Edition, John Wiley & Sons, Inc., New York (1997), p. 277) No Month Available.*

Khan, S.A. et al.; *Composite Polymer Electrolytes Using Fumed Silica Fillers: Rheology and Ionic Conductivity*; Chem. Mater. 1994, 6:(12), pp. 2359–2363.

Hou, J.; *Composite Polymer Electrolytes Using Functionalized Fumed Silica and Low Molecular Weight PEO: Synthesis and Characterization*; (Abstract), (1997), Diss. Abstr. Int., B 1998, 58:(9), 4805, 1997.

Hou, J. et al.; *Preparation and Characterization of Cross–Linked Composite Polymer Electrolytes*; (Abstract) American Chemical Society, 1998.

(List continued on next page.)

*Primary Examiner*—Carol Chaney
*Assistant Examiner*—Susy Tsang-Foster
(74) *Attorney, Agent, or Firm*—Myers Bigel Sibley & Sajovec

(57) ABSTRACT

A composite electrolyte comprises an inorganic clay material and a dielectric solution having a dielectric constant ranging from about 50 to about 85. The composite electrolyte has an ion transference number ranging from about 0.80 to about 1.00. An electrode comprises a component selected from the group consisting of an inorganic clay filler, a polymer, and mixtures thereof. Batteries and electrochemical cells comprising the above composite electrolytes and electrodes are also disclosed.

30 Claims, 15 Drawing Sheets

U.S. PATENT DOCUMENTS

| | | | |
|---|---|---|---|
| 4,959,138 A | 9/1990 | Brinkmann et al. | 204/414 |
| 4,990,413 A | 2/1991 | Lee et al. | 429/191 |
| 5,011,501 A | 4/1991 | Shackle et al. | 29/623.1 |
| 5,011,751 A | 4/1991 | Yoneyama et al. | 429/192 |
| 5,168,019 A | 12/1992 | Sugeno | 429/194 |
| 5,194,341 A | 3/1993 | Bagley et al. | 429/189 |
| 5,219,682 A | 6/1993 | Bones et al. | 429/193 |
| 5,360,686 A | 11/1994 | Peled et al. | 429/191 |
| 5,472,808 A | 12/1995 | Peled et al. | 429/192 |
| 5,486,435 A | 1/1996 | Brochu et al. | 429/192 |
| 5,523,181 A | 6/1996 | Stonehart et al. | 429/192 |
| 5,529,707 A | 6/1996 | Kejha | 252/62.2 |
| 5,576,115 A | 11/1996 | Capuano et al. | 252/62.2 |
| 5,665,491 A | 9/1997 | Tomiyama et al. | 429/194 |
| 5,965,299 A | 10/1999 | Khan et al. | 429/313 |

FOREIGN PATENT DOCUMENTS

| | | | | |
|---|---|---|---|---|
| JP | 09115505 | | 5/1997 | H01M/4/02 |
| JP | 10-269844 A | * | 10/1998 | |
| WO | WO94/02425 | | 2/1994 | C03C/17/28 |
| WO | WO95/06332 | | 3/1995 | H01M/2/16 |
| WO | WO96/31572 | | 10/1996 | C09J/11/04 |
| WO | WO 98/20573 | | 5/1998 | H01M/6/18 |

OTHER PUBLICATIONS

Fan, J. et al.; Composite Electrolytes Prepared from Fumed Silica, Polyethylene Oxide Oligomers, and Lithium Salts; J. Electrochem. Soc., 144:(2), Feb. 1997, pp. 399–408.

Raghavan, S.R. et al.: Composite Polymer Electrolytes Based on Fumed Silica: Mechanical Response and Processability; Electrochemical Society Proceedings vol. 96–17, Oct. 6–11, 1996, pp. 74–89.

Matsuo, Y. et al.: Ionic conductivity of poly(ethylene glycol)–$LiCF_3SO_3$–ultrafine $SiO_2$ composite electrolytes: Effects of addition of the surfactant lithium dodecylsulfate; Solid State Ionics 79 (1995) pp. 295–299.

Fauteux et al., Electrochimica Acta, Lithium Polymer Electrolyte Rechargeable Battery, pp. 2185–2190 (1995).

Bourgeat–Lami et al., Die Angewandte Makromolekulare Chemie, Emulsion Polymerization in the Presence of Colloidal Silica Particles, pp. 105–122 (1996).

Fritz et al., Journal of Power Sources, A New Type of Electrolyte for Galvanic Elements, pp. 315–323 (1992).

Croce et al., Chemistry of Materials, Electrochemical and Spectroscopic Study of the Transport Properties of Composite Polymer Electrolytes, pp. 1134–1136 (1992).

Gang et al., Solid State Ionics, Comparison of NMR and Conductivity in $(PEO)_8LiClO_4+\gamma$–$LiAlO_2$, pp. 1102–1105 (1992).

Plocharski et al., Solid State Ionics, Peo Based Composite Solid Electrolyte Containing Nasicon, pp. 979–982 (1987).

Wieczorek et al., Electrochimica Acta, Composite Polyether Based Solid Electrolytes, vol. 40, No. 13–14, pp. 2251–2259 (1995).

Appetecchi et al., The Journal of Electrochemical Society, A New Class of Advanced Polymer Electrolytes and Their Relevance in Plastic–like, Rechargeable Lithium Batteries, vol. 143, pp. 6–12 (1996).

Wieczorek et al., Macromolecules, Polyether, Poly (N,N–dimethylacrylamide), and $LiClO_4$ Composite Polymeric Electrolytes, pp. 143–261 (1996).

Koksbang et al., Solid State Ionics, Review of Hybrid Polymer Electrolytes and Rechargeable Lithium Batteries, pp. 320–335 (1994).

Riley et al.; "Nanocomposite Based Electrolytes for Lithium–ion Batteries,", Material Research Society Symposium Proceedings 575:6 pp. (Spring, 1999). Apr. 5–9, 1999, San Francisco, CA.

Riley et al.; "Lithium Hectorite–Based Composite Electrolytes: Performance in Lithium–ion Batteries," Lithium Batteries, Symposium Proceedings from the $196^{th}$ Meeting of the Electrochemical Society 99:25 7 pages (Fall, 1999).

Doyle et al.; The Importance of the Lithium Ion Transference Number in Lithium/Polymer Cells, Electrochimica, Acta 39:13 2073–2081 (1994).

Van Olphen; "Electric Double–Layer Structure and Stability of Clay Suspensions," An Introduction to Clay Colloid Chemistry, John Wiley and Sons, pp. 92–110 (1977).

Aranda et al.; "Poly(ethylene oxide)–Silicate Intercalation Materials," Chem. Mater. 4:1395–1403 (1992).

Hutchison et al.; "Conductivity Anisotrophy of Polyphosphazene–Montmorillonite Composite Electrolytes," Chem. Mater. 8:1597–1599 (1996).

Doeff et al.; "Li ion conductors based on laponite/poly(ethylene oxide) composites," Solid State Ionics 113–115 (1998) 109–115.

Bruce et al.; "Steady State Current Flow in Solid Binary Electrolyte Cells," J. Electroanal. Chem. 1–17 (1987).

Raghavan et al.; "Composite Polymer Electrolytes Based on Poly(ethylene glycol) and Hydrophobic Fumed Silica: Dynamic Rheology and Microstructure," Chem. Mater. 10:244–251 (1998).

Fan et al.; "Electrochemical impedance spectra of full cells: Relation to capacity and capacity–rate of rechargeable Li cells using $LiCoO_2$, $LiMn_2O_4$, and $LiNiO_2$ cathodes," Journal of Power Sources 72:165–173 (1998).

Waddell, W.H. et al.; Organic Polymer–Surface Modified Precipitated Silica; Journal of Applied Polymer Science 55:(12) Mar. 21, 1995, pp. 1627–1641.

Lee et al.; "Electronic behavior of Li–GIC in the lithium secondary battery," Materials Chemistry and Physics 53:243–246; (1998).

Telli et al.; "Study of a pH sensor with $MnO_2$ and montmorillonite–based solid–state internal reference," Solid State Ionics 128:255–259 (2000).

International Search Report, PCT/US00/28460, Date of Mailing: Apr. 25, 2001.

Riley et al., "Transport Properties of Lithium Hectorite–Based Composite Electrolytes" Journal of the Electrochemcial Society, 149 (6) A667–A674, 2002. (No Month Available).

Riley et al., "Lithium Hectorite–Based Composite Electrolytes: Performance in Lithium–Ion Batteries", Electrochemcial Society Proceedings vol. 99–25, p. 556–562 (1999). (No Month Available).

* cited by examiner

COMPOSITE ELECTROLYTES BASED ON SMECTITE CLAYS AND HIGH DIELECTRIC ORGANIC LIQUIDS AND ELECTRODES

CROSS-REFERENCE TO RELATED APPLICATIONS

The application claims priority to U.S. provisional applications Ser. No. 60/141,697 filed Jun. 30, 1999 and 60/159,671 filed Oct. 15, 1999, the disclosures of which are incorporated herein by reference in their entirety.

FIELD OF THE INVENTION

The invention generally relates to composite electrolytes that possess a unique combination of electrochemical and mechanical properties, along with electrodes.

BACKGROUND OF THE INVENTION

Research in polymer electrolytes for use in rechargeable lithium and lithium-ion batteries has been ongoing for decades. However, performance of conventional electrolytes is still less than desirable. A long-standing goal of electrolyte research generally relates to the preparation of an electrolyte that combines the solid-like characteristics of conventional thermoplastics with the ionic conductivity of low molar mass liquids. It is also desirable that the lithium ion transference number be as close to unity as possible in order to minimize or eliminate electrolyte polarization thereby reducing potential losses and improving power output.

The majority of polymer electrolyte research has focused on employing polyethylene oxide (PEO) and PEO derivatives complexed with various lithium salts. A lithium salt dissolved in a high-molecular weight PEO by itself typically does not yield a room temperature conductivity sufficiently high enough for practical application in a lithium battery (i.e., greater than $10^{-3}$ S/cm). Various approaches have been attempted to develop solid electrolytes for lithium cells, which yield improved room temperature conductivity. Fauteux et al. [*Electrochimica Acta*, 1995, 40, 2185] has categorized these approaches into two classes, namely (1) "pure" solid polymer electrolyte systems, and (2) network or gel-polymer electrolyte systems, and Koksbang et al. [*Solid State Ionics*, 1989, 36, 320] has compiled examples of each class. In the first class, blends of polyethers that may be copolymerized with co-monomers can be used to lower the glass transition temperature $T_g$ and produce a polymer with reduced crystallinity. The class also includes co-polymers of polyether-grafted polyether, polysiloxane, or polyphosphazene backbones. Alternatively, plasticizers may be added to the PEO, either as an absorbed liquid or a plasticizing lithium salt, to attempt to effect an increase in conductivity.

U.S. Pat. No. 5,965,299 to Khan et al. proposes a composite electrolyte comprising (a) a surface modified fumed silica filler comprising polymerizable groups being bonded to each other such that the surface modified fumed silica filler is crosslinked in a three-dimensional structure, (b) a dissociable lithium salt, and (c) a bulk medium containing the surface modified fumed silica filler and the dissociable lithium salt.

Notwithstanding the above efforts, there remains a need in the art for electrolytes for use in electrochemical cells including lithium and lithium-ion batteries, which exhibit high conductivities and good mechanical properties. In particular, there is a need for electrolytes that exhibit lithium-ion transference numbers that are close or equal to unity.

SUMMARY OF THE INVENTION

In one aspect, the invention provides a composite electrolyte. The composite electrolyte comprises an inorganic clay material and a dielectric solution having a dielectric constant ranging from about 50 to about 85. The composite electrolyte has an ion transference number ranging from about 0.80 to about 1.00.

In another aspect, the invention provides an electrode for use in a battery or electrochemical cell, said electrode comprising a component selected from the group consisting of an inorganic clay filler, a polymer, and mixtures thereof.

These and other aspects of the invention are disclosed in greater detail herein.

DETAILED DESCRIPTION OF THE PREFERRED EMBODIMENTS

Figure 1:
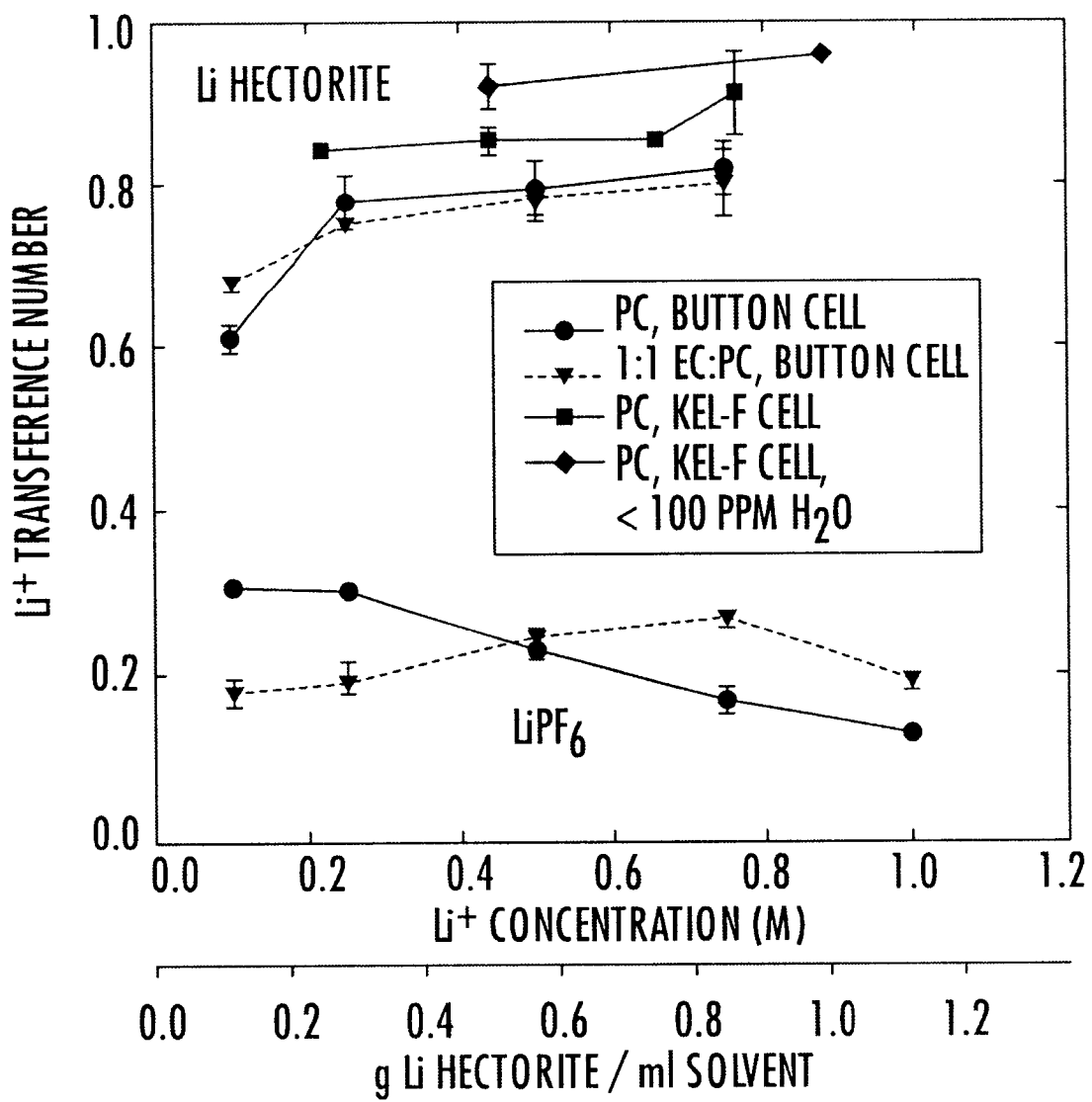
FIG. 1 illustrates the effect of lithium ion concentration on lithium-ion transference numbers for various composite electrolytes of the invention.

The invention will now be described with respect to the preferred embodiments. It should be appreciated that these embodiments are for illustrative purposes only, and should not be construed as limiting the scope of the invention as defined by the claims.

In one aspect, the invention provides a composite electrolyte. The composite electrolyte comprises an inorganic clay material present in a dielectric solution having a dielectric constant ranging from about 50 to about 85. The composite electrolyte has an ion transference number ranging from about 0.80 to about 1.00. Preferably, the composite electrolyte is a single-ion (e.g., lithium) conducting electrolyte.

Preferably, the inorganic clay material is present as a smectite clay. Examples of smectites include, without limitation, hectorite, montmorillonite, saponite, and mixtures thereof. As known in the art, a "smectite" clay is a layered clay with each platelet characterized by two outer tetrahedra silicone-oxide sheets sandwiching a central octahedra sheet of varying composition (e.g., trioctahedra magnesium-oxide for hectorite and dioctohedra aluminum-oxide for montmorillonite). A portion of the inner octahedra metal ions is substituted by ions of lower valency (e.g., $Li^+$ for $Mg^{2+}$ in hectorite and $Mg^{2+}$ for $Al^{3+}$ in montmorillonite), creating a net negative charge on the smectite platelet. Not intending to be bound by theory, it is believed that this charge is compensated by exchangeable cations (e.g., $Na^+$, $Ca^{2+}$, and $Li^+$) between the platelets. The resulting composite electrolyte preferably is present in the form of a gel structure comprised of the smectite platelets dispersed in the dielectric liquid. Advantageously, cation solvation in the dielectric liquid is high allowing for good conductivity. At the same time, the hectorite present in the electrolyte possesses poor mobility, thus leading to good cation transference number values. In one embodiment, a three dimensional hectorite platelet structure may be formed by face-to-face repulsion and edge-to-edge and/or edge-to-face attraction. In various embodiments, metal ions of groups IA and IIA are encompassed by the above-mentioned smectites (e.g., lithium hectorite, lithium montmorillonite, or lithium saponite) that are considered mobile. Synthetic smectites are also encompassed by the invention and include, for example Laponite® made commercially available by Southern Clay Products of Gonzales, Tex.

Inorganic clay materials of various dimensions can be used. Preferably, the inorganic clay material has a length ranging from about 100 nm to about 500 nm, and more preferably from about 200 nm to about 300 nm, and most preferably about 250 nm. The inorganic clay material preferably has a width ranging from about 0.5 nm to about 1.5 nm, and is most preferably about 1.0 nm.

The composite electrolyte may comprise various amounts of inorganic clay material. For example, in one embodiment the composite electrolyte comprises from about 20 to about 50 weight percent of inorganic clay material, and more preferably from about 30 to about 40 weight percent.

Any number of components can be used in the dielectric solution of the present invention. Preferably, the dielectric solution comprises a high-dielectric carbonate. Exemplary carbonates include, without limitation, ethylene carbonate and propylene carbonate and mixtures thereof. Other carbonates that may be added include, without limitation, dimethyl carbonate diethyl carbonate, methyl ethyl carbonate, and mixtures thereof. Other solvents that may be added include, without limitation, polyethylene glycols and high donor number solvents such as n-n-dimethylacetamide. In the event that one or more carbonates are used in a solution, various amounts of these can be employed. For example, in one embodiment, the dielectric solution comprises a 1:1 volume ratio mixture of ethylene carbonate and propylene carbonate. In another embodiment, the dielectric solution comprises ethylene carbonate, propylene carbonate, and dimethyl carbonate in a 2:1:1 volume ratio respectively.

The dielectric solution may be present in various quantities in the composite electrolyte of the invention. In one embodiment, for example, the composite electrolyte comprises from about 50 to about 80 percent by weight of the dielectric solution and more preferably from about 60 to about 70 percent by weight.

The composite electrolyte of the present invention is advantageous in that it offers a desirable combination of electrochemical and mechanical properties. In a preferred embodiment, the composite electrolyte has an elastic modulus ranging from about $10^6$ dynes/$cm^2$ to about $10^8$ dynes/$cm^2$. In another preferred embodiment, the composite electrolyte has a yield stress ranging from about $10^4$ dynes/$cm^2$ to about $10^6$ dynes/$cm^2$. In another preferred embodiment, the composite electrolyte has a conductivity ranging from about $9 \times 10^{-5}$ S/cm or about $1 \times 10^{-4}$ S/cm to about $6 \times 10^{-4}$ S/cm. In another preferred embodiment, the composite electrolyte has lithium ion transference numbers from about 0.80 to about 1.00.

In another aspect, the invention relates to an electrochemical cell which may be used in a variety of devices such as, but not limited to, lithium and lithium-ion containing batteries, capacitors, and the like. Such devices are useful in a variety of end use applications such as, for example, chemical sensors and electrochromic windows. In general, the electrochemical cell comprises an anode, a cathode, and a composite electrolyte interposed between the anode and cathode, the composite polymeric electrolyte being described herein. In the event that porous anodes and cathodes are used, the composite electrolyte may be used to fill in the voids in the anodes and cathodes. The electrochemical cell is produced in accordance with techniques that are known in the art.

A number of anodes may be used in the electrochemical cell, the selections of which are well known to the skilled artisan. Anodes that may be used include, for example, those containing alkali metals and transition metals. Specific examples include lithium, graphite, polymers, tin-based glass oxide, and mixtures thereof. Several conventional cathodes may be used in the electrochemical cell such as, for example, $TiS_2$, $V_6O_{13}$, $FeS_2$, $LiNiO_2$, $LiCoO_2$, and $LiMn_2O_4$ cathodes. Organic sulfur compounds may be also utilized in cathodes and include, for example, mercaptans and dimercaptans. Composite electrodes described in detail further herein may also be used.

As alluded to herein, the invention also relates to a battery that employs a composite electrolyte of the invention. The battery comprises an anode, a cathode, and interposed between the anode and the cathode, a composite electrolyte. Suitable batteries include, for example, lithium and lithium-ion batteries, those batteries being known to one skilled in the art. The distinction between these types of batteries relates to the materials used in the anode. For example, anodes used in lithium-ion batteries usually include elemental lithium intercalated in a conventional form of carbon of suitable particle size. Examples of carbon used in this application may include, but are not limited to, graphite, petroleum coke, fine charcoal, and the like. The carbon particles are typically mixed with a suitable organic binder, and the mixture is then usually cast or molded into thin squares or rectangular plates of convenient dimensions. A lithium battery, on the other hand, is one which has an anode formed from lithium metal. The term "lithium metal" is to be broadly construed and may include lithium alone or in combination with other metals as an alloy.

In another aspect, the invention relates to a composite electrode and a process by which it may be produced, with applications in electrochemical cells and batteries, particularly those, for example, which involve lithium and lithium-ion batteries. In particular, the electrode comprises a component selected from the group consisting of an inorganic clay filler, a polymer, and mixtures thereof.

In one embodiment, the electrode may be formed by incorporating a relatively small amount (preferably less than 20 percent by weight, more preferably from about 15 to about 20 percent by weight, and most preferably from about 3 to about 10 percent by weight) of inorganic clay filler material including without limitation, those set forth hereinabove. The inorganic clay materials may have any of the dimensions set forth above if so desired. Examples include lithium-exchanged smectite clay and/or a high molecular weight lithium-exchanged single-ion conducting polymer electrolyte (e.g., lithiated NAFION® sold by E.I. DuPont de Nemours of Wilmington, Del.).

For the purposes of the invention, the term "lithium-exchanged smectite clay is defined as any smectite clay in which the associated cations have been exchanged with lithium ions. Examples of smectite clays include, but are not limited to, hectorite, montmorillonite, saponite, and mixtures thereof. These materials may be employed in an intercalation-type of lithium-ion cathode (e.g., $LiCoO_2$, $LiNiO_2$, or $LiMn_2O_4$) or anode (e.g., graphite).

Various polymers may be used as polymer electrolytes in the electrode of the invention. Preferably the polymer is a lithiated polymer. Fluorinated polymers may be employed, including for example a copolymer of an alkyl vinyl ether monomer. An exemplary polymer is of the formula:

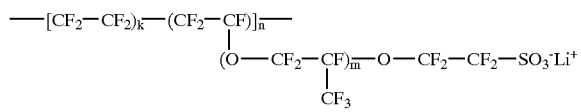

wherein k ranges from 5 to 13.5; n ranges from 100 to 1000; and m is an integer ranging from 1 to 3. More preferably, wherein k averages 6.56, n is 1000, and m is 1, with the molecular weight of this material being 1100 equivalent weight. A commercially preferred polymer is Nafion® sold by E.I. DuPont de Nemours of Wilmington, Del. It is preferred that an electrode comprise from about 3 to about 10 percent by weight of the polymer. In addition to the inorganic clay material of the polymer, the electrode comprises electroactive materials conventionally employed in electrodes.

Although not intending to be bound by theory, incorporation of a lithium-exchanged smectite clay and/or lithium-ion conducting polymer electrolyte into the electrode during the casting process is believed to have the potential to significantly improve capacity as the solid-like nature of the smectite-based composite electrolyte prevents it from easily penetrating the pores of conventional electrolytes as a liquid electrolyte would. Proper dispersion of the smectite prior to the introduction to the electrode casting solvent and binder, such as, for example, 1-methyl-2-pyrrolidinone (NMP) and PVDF, typically requires the use of a small amount of water. However, a small amount of water may cause the PVDF binder to coagulate. Thus, the amount of water employed should be limited, which often results in the inadequate dispersion of the hectorite. This, in turn, can potentially lead to less than optimum electrode performance. Instead, the smectite-based composite electrolyte may be directly blended into the electrode prior to casting. The water content should be comparably low (typically observed in the 100 to 200 ppm range) such that it will not interfere with the PVDF binder. Alternatively, a lithiated polymer may be incorporated into the electrode, the polymer then acting as both a lithium conductor in the pores of the electrode and a binder for the electrode particles. The lithiated polymer may also be used in conjunction with the lithium-exchanged smectite to aid in the smectite dispersion in the electrode. The lithium-exchanged smectite and the polymer electrode are typically mixed separately into aqueous-based solvents. The two mixtures may then be blended together to form a third mixture that preferably contains approximately equal amounts by mass of smectite and polymer electrolyte. The mixture is then typically dried to remove water and any other solvents that may be present, leaving a solid consisting of layered smectite and polymer electrolyte. This material may then be readily blended into a wide range of polar solvents that may be used as the solvent for the electrode casting process. The selection of such solvents may be arrived at by one who is skilled in the art.

Although not wishing to be bound by any theory, Applicants believe that when used with single-ion conducting electrolytes, the composite electrode potentially offers improved electrode-electrolyte interfacial lithium-ion transfer over conventional electrodes. This offers the potential for significantly improved capacity for these systems. Again not wishing to be bound by theory, these improved characteristics may be due to the use of a mineral and/or polymer filler. The novel electrolyte system is believed to offer potential advantages over existing technologies.

The batteries and electrochemical cells that employ the composite electrolytes and/or electrodes are useful in a variety of applications. Such applications include, but are not limited to, electric vehicles, portable electronic goods, and the like. Rechargeable batteries are particularly useful for these applications. Conductivity is often a significant consideration used to evaluate the suitability of electrolytes for lithium metal and lithium-ion cells. However, the importance of lithium-ion transference number to cell performance may rival that of the electrolyte conductivity, as demonstrated by the theoretical studies of Doyle, Fuller, and Newman, *Electrochimica Acta*, 39, 2073 (1994).

Of particular interest are high-discharge applications (e.g., electric vehicles), where a lithium-ion transference number near unity may offset a drop in conductivity of up to an order of magnitude.

Any number of electrolytes may be used in conjunction with the electrodes of the invention, including the composite electrolytes described herein above. Other examples of electrolytes that can be used include, but are not limited to, those set forth in U.S. Pat. No. 5,965,299, the disclosure of which is incorporated herein by reference in their entirety. Other conventional electrolytes may also be employed.

The electrodes of the invention may be employed in various batteries and electrochemical cells, the selection of which are apparent to one who is skilled in the art. Such examples of batteries and electrochemical cells include, without limitation, those described hereinabove.

The invention will now be described in greater detail with respect to the following examples. It should be appreciated that the examples are set forth for the purposes of illustrating the invention, and are not intended to define the scope of the invention as set forth by the claims.

EXAMPLES 1–16

Composite Electrolytes

Examples 1–16 generally illustrate the composite electrolytes of the invention. In these examples, synthetic sodium hectorite was provided by Hoechst of Frankfurt, Germany (SKS-21, 88 meq/100 g, 250 nm avg. size). Ethylene carbonate (EC), propylene carbonate (PC), and dimethyl carbonate (DMC) were obtained from Aldrich of Milwaukee, Wis. and dried using 4 Å molecular sieves. Lithium hexafluorophosphate (LiPF$_6$) was obtained from Aldrich and vacuum dried at approximately 120° C. for 24 hours. Water content was measured using a Mitsubishi CA-06VA-06 Karl-Fischer titrator sold by Cosa Instrument Corporation of Norwood, N.J. CELGARD 2400 and VERATEC POWERWEB (nonwoven polyolefin) separators (Hoechst Celanese of Charlotte, N.C. and Veratec of Walpole, Mass.) were used for liquid electrolytes, while polypropylene screening was used as a separator for the lithium hectorite-based composite electrolytes. Conductivities were determined using two platinum electrodes and standard AC impedance techniques. Lithium-ion transference numbers were determined using the steady-state current method of Bruce and Vincent, J. Electroanal. Chem., 225, 1 (1987). Electrochemical measurements were performed using a PAR 273 potentiostat and 5210 lock-in amplifier (Princeton Applied Research of Oak Ridge, Tenn.). Yield stress and elastic modulus were measured using a Dynamic Stress Rheometer sold by Rheometric Scientific of Piscataway, N.J.

Example 1

Composite Electrolyte Synthesis Procedure

The following illustrates a procedure for making a composite electrolyte in accordance with the invention:
1) Ion-exchange sodium hectorite to lithium form
   a. 20 to 40 g sodium hectorite (Na hectorite)
   b. 20 to 40 g LiCl.
   c. Add Na hectorite to 900 ml water and mix well (blender).
   d. Add LiCl to 100 ml water.
   e. Mix LiCl solution into Na hectorite dispersion and let stand overnight.
   f. Centrifuge to separate Na hectorite (~30 min.).
   g. To achieve highest exchange, repeat process. For these experiments, exchange was performed three times total.
   h. After final exchange, dilute with DI water to 1000 ml, centrifuge, and repeat. Dry (100° C., ambient pressure) and rinse with methanol (~500 ml), then dry again (100° C., ambient pressure).
2) Disperse lithium hectorite in EC (ethylene carbonate) or PC (propylene carbonate)
   a. Mix lithium hectorite in water (~10 to 20 wt. %)
   b. Add approximately equivalent mass EC or PC as water and mix well
   c. Dry in oven at 100° C. (ambient pressure) for about 12 to 24 hrs to remove majority of water.
   d. Dry in vacuum oven at 120°C. for 30 to 45 minutes. Water will be driven off as well as EC or PC. If too much EC or PC is removed, the hectorite particles will collapse and will not be dispersible without adding more water. Approximately 50 wt. % hectorite in EC or PC is the maximum allowable concentration to prevent significant particle collapse. A dry argon back purge on the vacuum oven is recommended.
   e. Add more EC or PC (dried) under argon atmosphere to dilute mixture back to approximately 20 to 30 wt. % hectorite. Dry in vacuum oven, dilute, then dry once more. Water content (less than 100 ppm) is achievable. Concentrated form (less than 50 wt. %) can be diluted/dispersed to desired concentration.
3) Hectorite films
   a. Thin films (less than 100 μm) of lithium hectorite can be produced from higher concentrations of composite (approximately 30 to 50 wt. % hectorite in carbonates).
   b. Composite is placed between two aluminum foils and pressed into films using a hydraulic jack. Pressures up to approximately 17,000 psi have been used to produce films as thin as 50 μm. The aluminum foil can be peeled away from each side of the film
   c. Films used in experimental lithium-ion cells have been made using approximately 40 wt. % lithium hectorite in EC pressed into films. Drops of 1:1 EC:DMC (v:v) mix are added to the film to dilute the mixture to approximately 30 wt. % lithium hectorite. (DMC—dimethyl carbonate) The DMC is added to promote good room temperature conductivity, as EC is a solid at room temperature.

Example 2

Lithium-ion Transference Numbers

Lithium-ion transference numbers were determined at various Li$^+$ concentrations. Sample volumes of approximately 0.03 ml (button cells) and 0.3 ml (Kel-F cells) were used having a water content ranging from 50 to 200 ppm as indicated in the figure insert. The transference numbers were measured according to standard techniques. As shown in FIG. 1, the samples displayed transference numbers generally ranging from 0.8 to 1.0.

Example 3

Lithium-ion Transference Numbers—Comparative Example

Lithium-ion transference numbers were determined for conventional LIPF$_6$ electrolytes similar to Example 2 using standard button cell measurements. As shown the transference numbers obtained from the electrolytes of the invention displayed superior properties relative to the conventional electrolytes.

Example 4

Dynamic Yield Stress Determination

Figure 2:
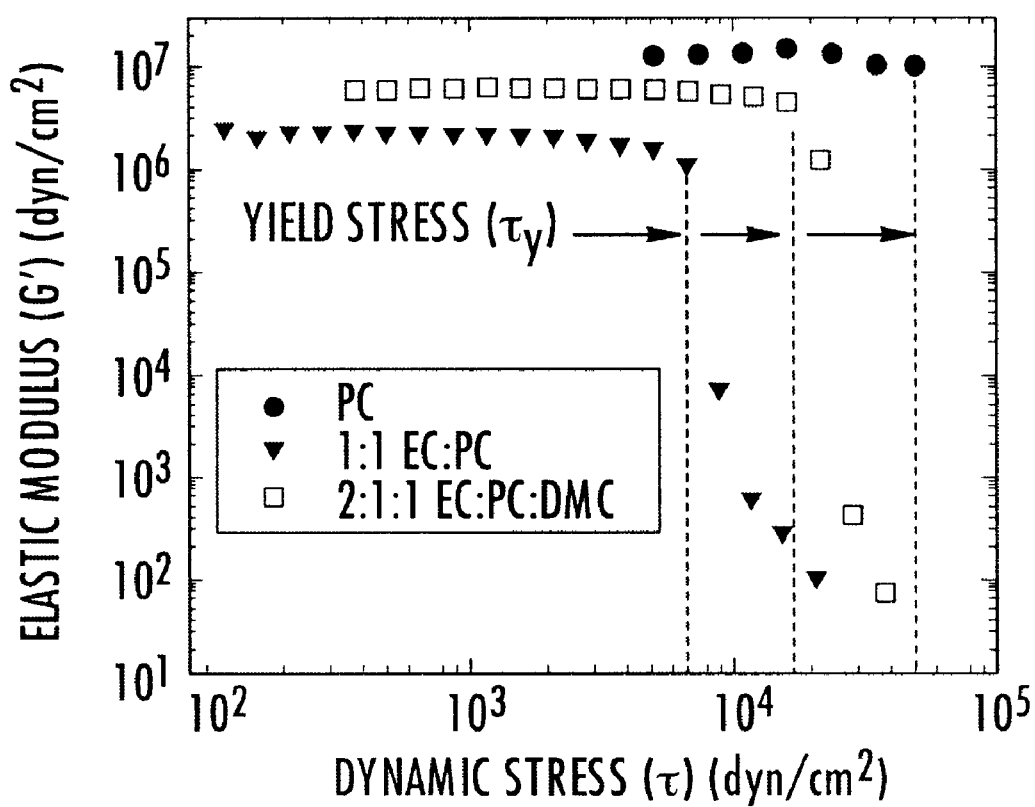
FIG. 2 illustrates dynamic stress sweeps for various composite electrolytes of the invention.

Dynamic stress sweeps (elastic modulus as a function of dynamic stress) were performed at room temperature using samples of lithium hectorite composite electrolytes (0.25 M Li$^+$, approximately 20 weight percent lithium hectorite) with propylene carbonate as the dielectric solution. Dynamic yield stress was measured. The results are set forth in FIG. 2.

Example 5

Dynamic Yield Stress Determination

The procedure according to Example 4 was repeated except that a 1:1 volume ratio mixture of ethylene carbonate and propylene carbonate was employed as the dielectric liquid. The results are set forth in FIG. 2.

Example 6

Dynamic Yield Stress Determination

The procedure according to Example 4 was repeated except that a mixture of ethylene carbonate, propylene carbonate, and dimethyl carbonate was employed as the dielectric liquid in a 2:1:1 volume ratio respectively. The results are set forth in FIG. 2.

Example 7

Elastic Modulus Measurements

Figure 3:
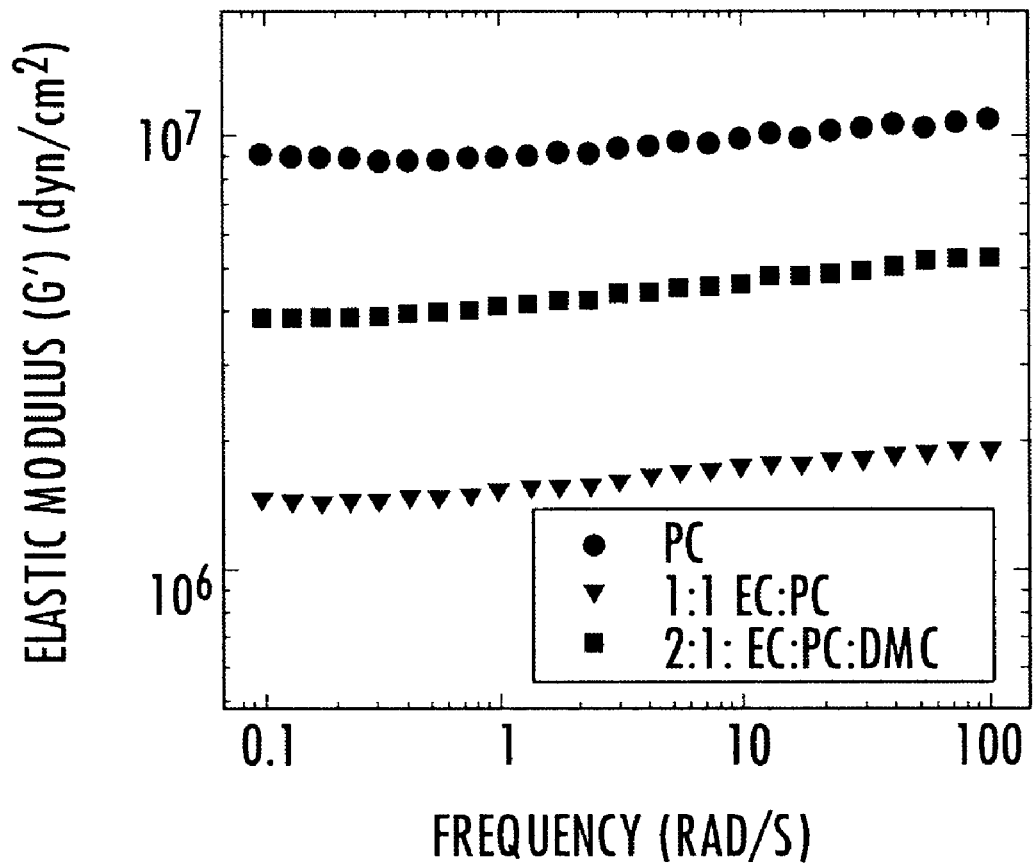
FIG. 3 illustrates elastic modulus values for various composite electrolytes of the invention.

A 20 weight percent lithium hectorite composite electrolyte using a propylene carbonate dilelectric solution was prepared in accordance with the invention. The elastic modulus of the electrolyte was measured as a function of frequency. The results are set forth in FIG. 3. The composite electrolyte generally exhibits gel-like behavior as evidenced by the elastic modulus being independent of frequency.

Example 8

Elastic Modulus Measurements

The procedure according to Example 7 was repeated except that a dielectric solution comprising a 1:1 volume ratio of ethylene carbonate and propylene carbonate was employed. The results are set forth in FIG. 3. The composite electrolyte generally exhibits gel-like behavior as evidenced by the elastic modulus being independent of frequency.

Example 9

Elastic Modulus Measurements

The procedure according to Example 7 was repeated except that a dielectric solution comprising a 2:1:1 volume ratio of ethylene carbonate, propylene carbonate, and diemethyl carbonate was employed. The results are set forth in FIG. 3. The composite electrolyte generally exhibits gel-like behavior as evidenced by the elastic modulus being independent of frequency.

Example 10

Conductivity Measurements

Figure 4:
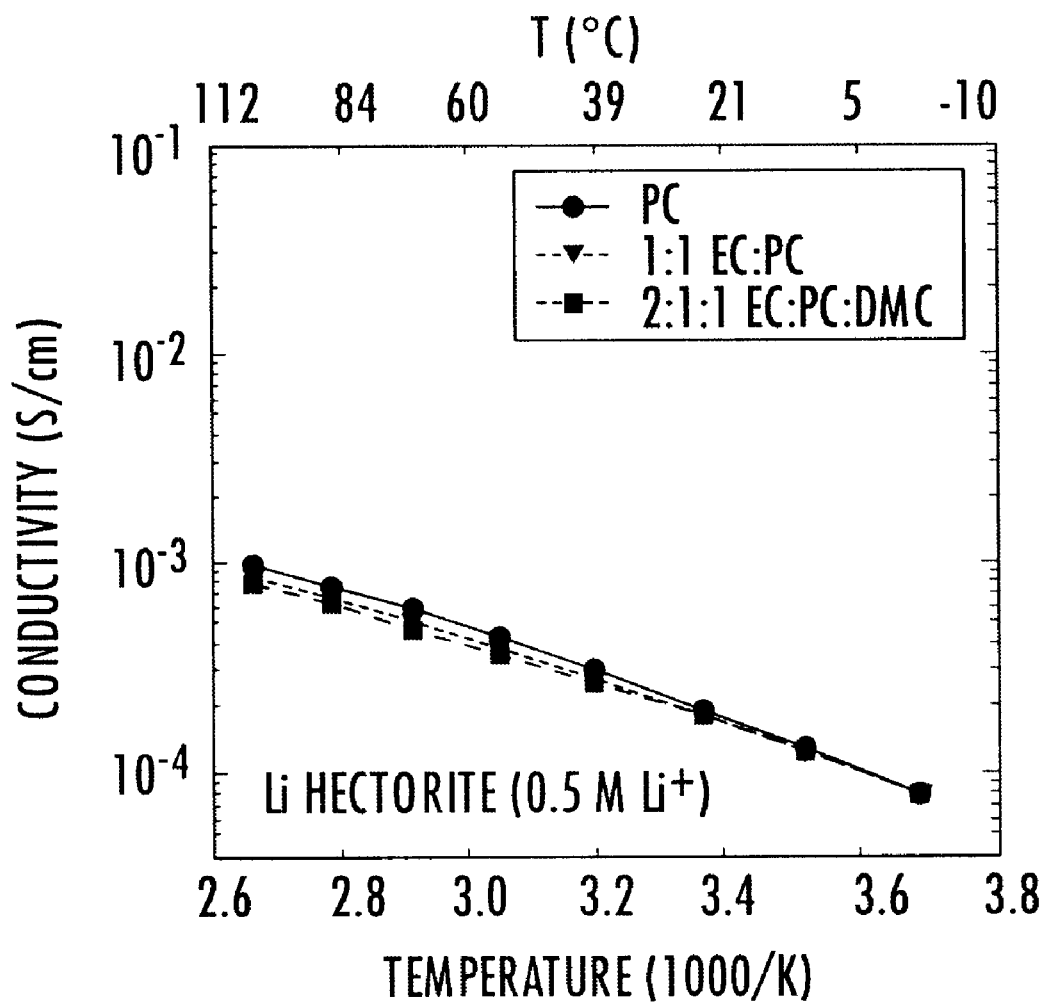
FIG. 4 illustrates conductivity values for various composite electrolytes of the invention.

The conductivity of a composite electrolyte of the invention was measured as a function of temperature using lithium hectorite and propylene carbonate as the dielectric solution. The results are illustrated in FIG. 4.

Example 11

Conductivity Measurements

The procedure according to Example 10 was repeated except that a 1:1 volume ratio mixture of propylene carbonate and ethylene carbonate was employed as the dielectric solution. The results are illustrated in FIG. 4.

Example 12

Conductivity Measurements

The procedure according to Example 10 was repeated except that a mixture of ethylene carbonate, propylene carbonate, and dimethyl carbonate was employed as the dielectric solution in a 2:1:1 volume ratio respectively. The results are illustrated in FIG. 4.

Example 13

Conductivity Measurements

Figure 5:
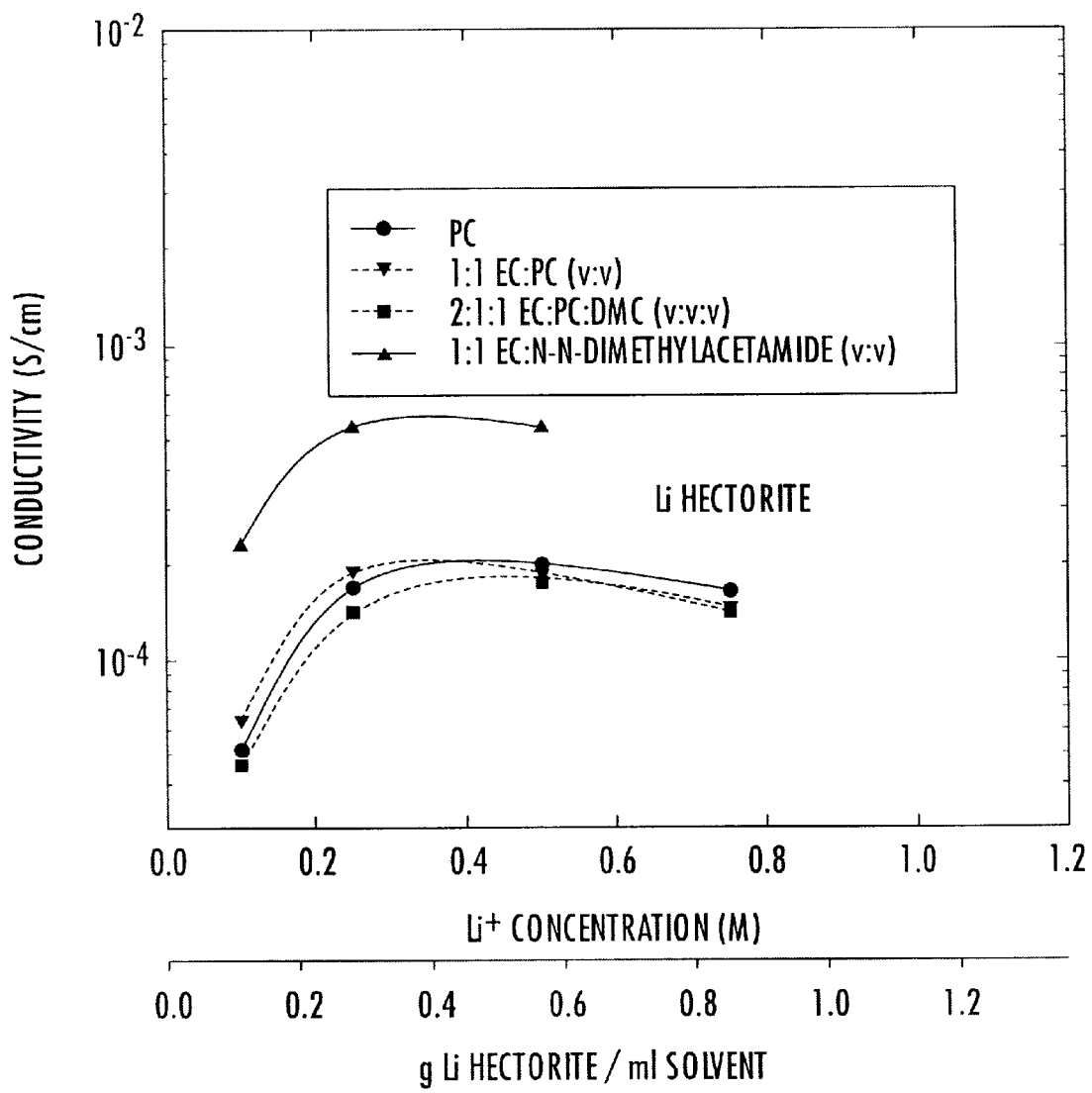
FIG. 5 illustrates conductivity values for various composite electrolytes of the invention.

The conductivity of a composite electrolyte of the invention was measured as a function of lithium concentration using lithium hectorite and propylene carbonate as the dielectric solution. The results are illustrated in FIG. 5.

Example 14

Conductivity Measurements

The procedure according to Example 13 was repeated except that a 1:1 volume ratio mixture of propylene carbonate and ethylene carbonate was employed as the dielectric solution. The results are illustrated in FIG. 5.

Example 15

Conductivity Measurements

The procedure according to Example 13 was repeated except that a mixture of ethylene carbonate, propylene carbonate, and dimethyl carbonate was employed as the dielectric solution in a 2:1:1 volume ratio respectively. The results are illustrated in FIG. 5.

Example 16

Conductivity Measurements

The procedure according to Example 13 was repeated except that a mixture of ethylene carbonate and n-n-dimethylacetamide was employed as the dielectric solution in a 1:1 volume ratio. The results are illustrated in FIG.

EXAMPLES 17–28

Composite Electrodes

Synthetic sodium hectorite (NaHect) from Hoechst of Frankfurt, Germany (SKS-21, 88 meq/100 g, 200 nm avg. size) was ion exchanged to the lithium form, rinsed, and dried. Dispersion in the carbonates (ethylene carbonate (EC), propylene carbonate (PC), and dimethyl carbonate (DMC) provided by Aldrich of Milwaukee, Wis.) and mixtures was performed using water as a dispersing aid. The resulting gel was dried to concentrated form and diluted to the final desired concentration and composition. Water content of the composites is typically in the 100–200 ppm range, as measured by Karl-Fischer titration.

NAFION® solution (obtained from E.I. DuPont de Nemours of Wilmington, Del.) was heated in an oven at 80° C. to remove the solvent. The remaining solid NAFION was then lithium exchanged in a 1 M lithium hydroxide (LiOH) aqueous solution. The solution was centrifuged to separate the NAFION from the solution and rinsed with deionized water to remove any remaining LiOH. The lithium-exchanged NAFION (lithium NAFION) was oven dried at 80° C. and redispersed in a propanol:water mixture.

The standard electrolyte chosen was 1 M $LiPF_6$ in 1:1 ethylene carbonate:ethyl methyl carbonate (EC:EMC) (EM Industries of Hawthorne, N.Y.) with a CELGARD 2400 separator (Hoechst Celanese, ~20μm thick). The composite electrolyte chosen for half-cell experiments was a 0.5 M LiHectorite in PC (approx. 30 weight. %) using polypropylene screening (McMaster-Carr, ~0.5 mm thick) as the separator. Full-cell experiments used a thin film (approx 100 μm) of approx. 0.5 M LiHectorite in 2:1 EC:DMC with no added separator. The concentration of the Li Hectorite is defined as the total moles of exchangeable Li ions (based on the hectorite exchange capacity, 88 meq/100 g) per ml of solvent.

Lithium-ion half-cells were constructed using $LiCoO_2$-based cathodes (EM Industries) versus lithium metal counter electrodes. A PVDF binder (KYNAR, Elf Atochem of Philadelphia, Pa.) and 1-methyl-2-pyrolidinone solvent (Aldrich) were employed in the casting of the electrodes using methods previously described (see J. Fan and P. S. Fedkiw, *Journal of Power Sources*, 72, 165 (1998)). The standard cathode composition used was 91 weight percent $LiCoO_2$, 6 weight percent graphite (Timrex™ SFG 44 Special Graphite, Timcal America of Westlake, Ohio), and 3 weight percent binder. Composite cathodes were produced by appropriately modifying the casting solvent and substituting a small percentage of LiHectorite and/or LiNafion for the $LiCoO_2$. For cells using composite cathodes and electrolytes, a small drop of solvent was placed on the cathode and allowed to soak in prior to cell assembly. Full-cells used similar cathodes with graphite anodes (Timrex SFG 6 Special Graphite, Timcal America of Westlake, Ohio), the standard composition being 95 weight % graphite and 5 weight % PVDF. Composite anodes were produced similar to the composite cathodes. Aluminum and copper foil current collectors are used for the cathode and anode respectively.

Cell cycling was performed at room temperature on an Arbin BT2042 battery tester sold by Arbin Instruments of College Station, Texas using cut-off voltages of 4.2 V charge/2.5 V discharge. A current of 1 mA approximately 0.8 $mA/cm^2$) was used for cells with the standard electrolyte. A current of 0.1 mA (approximately 0.8 $mA/cm^2$) was used for the composite electrolyte cells to avoid a large ohmic loss. Cell impedance was measured using a BAS-Zahner IM-6e Impedance Analyzer sold by Bioanalytical Systems of West Lafayette, Ind. Each measurement was duplicated with two cells.

Example 17

A standard $LiCoO_2$ cathode casting procedure is illustrated in this example:

a. Overall mixture composition (exact weights may be modified as long as ratio is maintained):

| | |
|---|---|
| 13.65 g $LiCoO_2$ | (91 wt. %) |
| 0.9 g graphite | (6 wt. %) |
| 0.45 g PVDF | (3 wt. %) |
| 8 g NMP | | b. Mix the PVDF into the NMP until it is dissolved, generally overnight (approximately 12 hours).
c. Blend the $LiCoO_2$ and graphite.
d. Mix the $LiCoO_2$/graphite mixture with the NMP/PVDF. Preferred results are typically obtained with overnight mixing to insure good dispersion.
e. Using a doctor blade set to approximately 300 μm, cast a film of the mixture onto an aluminum foil. The aluminum foil is rolled out and adhered to piece of glass with a couple of drops of NMP. Place in an oven at approximately 80–100° C. for about 6 hours to remove most or all of the NMP.
f. Remove the aluminum/$LiCoO_2$ film from the glass plate using a razor blade. Punch out individual electrodes using the ½" diameter punch.
g. Press the individual electrodes to approximately 8000 pounds at approximately 300° F. (150° C.).
h. Dry in a vacuum oven overnight at about 120° C.

The above procedure may also be used with other similar cathode materials such as $LiNiO_2$ and $LiMn_2O_4$.

Example 18

The foregoing example describes a procedure for making a LiHectorite composite cathode. Note that one composition is described here. The proportion of LiHectorite/$LiCoO_2$ may be varied somewhat and the same procedure followed.

a. Overall mixture composition (exact weights may be modified, it is preferred to maintained this ratio):

| | |
|---|---|
| 13.05 g $LiCoO_2$ | (91 wt. %) |
| 0.6 g LiHectorite | (4 wt. %) |
| 0.9 g graphite | (6 wt. %) |
| 0.45 g PVDF | (3 wt. %) |
| 15 g NMP | |
| 0.15 g DI water | | b. Using a standard procedure, mix PVDF with 8 g NMP, blend $LiCoO_2$ with graphite, and mix the two together.
c. Add the deionized water to the LiHectorite and mix well to create a thick paste. Add approximately 0.6 g NMP and mix well until uniform.
d. Continue adding NMP in small amounts of 1 or 2 g and mixing until all the remaining NMP has been added.
e. Blend the LiHectorite/water/NMP mixture with the $LiCoO_2$/graphite/PVDF/NMP mixture until uniform.

Alternatively, the NMP/PVDF and LiHectorite/DI water/PVDF may be blended and then mixed with the $LiCoO_2$/graphite.

f. Cast the film by the procedure used with the standard cathodes but adjust the doctor blade height higher to compensate for the lower solids content to produce a cathode with approximately the same mass as the standard cathode (approximately 500 μm). Follow the remaining procedure as with the standard cathodes.

The above procedure can sometimes cause cracking of the cathodes upon drying in the conventional oven prior to pressing. This may be possibly due to the removal of the water from the clay, i.e., similar to the cracking observed in the soil of a farm field on a hot day. If cracking occurs, the LiHectorite/$LiCoO_2$ cathode may be removed from the aluminum backing (or alternatively cast only to the glass to begin with), mixed back into NMP (approximately 12 g), and recast onto an aluminum foil.

Example 19

The procedure according to Example 18 is repeated except that a blend of the composite electrolyte (lithium hectorite in EC) is diluted down to 5 to 10 wt % lithium hectorite. This mixture is substituted for the LiHectorite/water/NMP mixture and eliminates possible cracking problems during cathode film drying.

Example 20

The procedure according to Example 18 is repeated except that LiHectorite is first mixed into deionized water at approximately 5 weight percent. The $LiCoO_2$ is therein mixed and the mixture is dried. This mixture can then be blended with the graphite/PVDF/NMP, cast, and pressed by employing known techniques.

A procedure is described for preparing a Li-NAFION composite cathode. Note that one example of a composition is described here. The proportion of Li-NAFION/$LiCoO_2$ may be varied somewhat and the same procedure followed.

a. Overall mixture composition (exact weights may be modified as long as ratio is maintained):

| | |
|---|---|
| 13.65 g LiCoO₂ | (91 wt. %) |
| 0.9 g graphite | (6 wt. %) |
| 0.45 g Li-NAFION | (3 wt. %) |
| 3 g DI water | |
| 3 g n-propanol | |
| 3 g i-propanol | | b. Mix the deionized water, n-propanol, and i-propanol Mix in the LI-NAFION (preferably overnight).

c. Blend the remaining components, cast and press.

d. Although not wishing to be bound by theory, it is believed that the Li-NAFION acts both as a binder and as the supplier of mobile lithium ions for good electrode/electrolyte interfacial contact, e. To incorporate PVDF binder into this cathode, it is preferred to find an alternative solvent that will dissolve both PVDF and Li-NAFION.

A procedure is described for making a Li-NAFION/LiHectorite composite cathode. Note that one example of a composition is described here Nonetheless, the proportions of LiHectorite/LiCoO₂ and Li-NAFION/LiCoO₂ may be varied somewhat and the same procedure followed a Overall mixture composition (exact weights may be modified as long as ratio is maintained):

| | |
|---|---|
| 12.75 g LiCoO₂ | (85 wt. %) |
| 0.9 g graphite | (6 wt. %) |
| 0.45 g Li-NAFION | (3 wt. %) |
| 0.45 g PVDF | (3 wt. %) |
| 0.45 g LiHectorite | (3 wt %) |
| 15 g NMP | |
| 3 g DI water | |
| 3 g n-propanol | |
| 3 g i-propanol | |
| 9 g DI water | | b. Blend the PVDF with 8 g NMP as previously described in the standard method (likewise for the LiCoO₂ and graphite).

c. Mix the 3 g DI water, n-propanol, i-propanol, and Li-NAFION as described in the Li-NAFION composite cathode.

d. Mix the LiHectorite with the 9 g DI water until a uniform gel is formed. Mix with the Li-NAFION solution until uniform. Spread the resulting gel in a petri dish(es) and dry in an oven at approximately 100° C. until dry (approximately 6 to 12 hours). It is believed that the resulting solid blend of Li-NAFION and LiHectorite can then be readily dispersed in a polar organic solvent, the choice in this case being NMP. It is preferred that the ratio of Li-NAFION/LiHectorite should not be too far from unity.

e. Mix the Li-NAFION/LiHectorite solid into the remaining 7 g of NMP.

f. Blend the PVDF/NMP and Li-NAFION/LiHectorite/NMP mixtures together. Add to the LiCoO₂/graphite and mix well until uniform.

g. Cast the film onto aluminum, dry, and press as previously described.

Alternatively, the PVDF could be reduced or eliminated and the Li-NAFION could act as both the binder and interracial enhancer as with the Li-NAFION composite cathodes.

Examples 23–28

The procedures according to Examples 17–22 are repeated except that composite anodes are formed. These anodes can be used with smectite-based composite electrolytes described herein. An example of an anode casting solution composition is as follows:

| | |
|---|---|
| 9.5 g graphite | (95 wt %) |
| 0.5 g PVDF | (5 wt %) |
| 20 g NMP | |

For different types/particle size graphites, the NMP content may be varied to achieve appropriate slurry viscosities for film casting. The anode films are cast onto copper foil.

In general, it is preferred that larger weight fractions of the single-ion conducting species should be added to the anode as compared to the cathode compositions due to the lower density of graphite compared to the lithium metal oxides used in the cathodes. Typically, about 10 weight percent of the single-ion conducting species (e.g., lithium exchanged smectite or lithiated polymer) is added to the anode.

Figure 6:
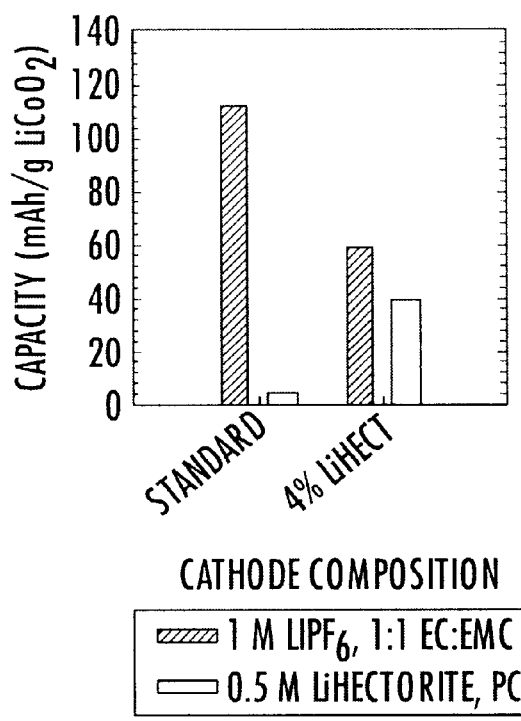
FIG. 6 illustrates the effect of 4 weight percent of LiHectorite to a $LiCoO_2$ cathode on lithium-ion half-cell capacity.
Figure 7:
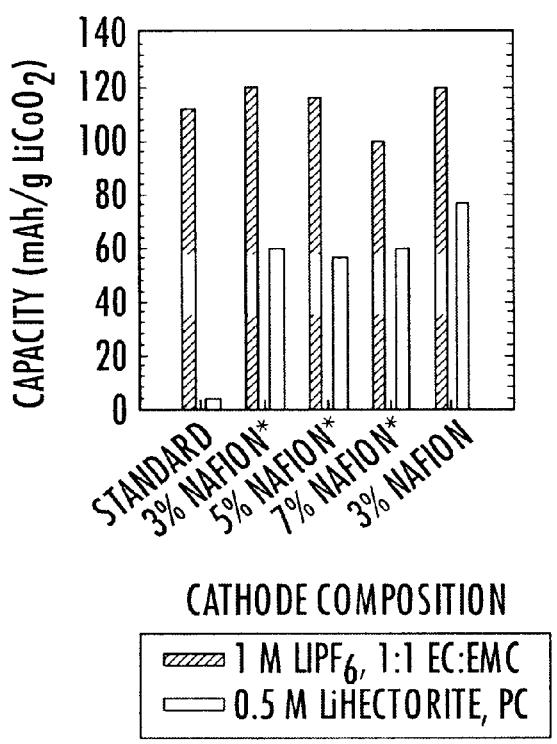
FIG. 7 illustrates the effect of Li-NAFION addition to a $LiCoO_2$ cathode on lithium-ion half-cell capacity.
Figure 8:
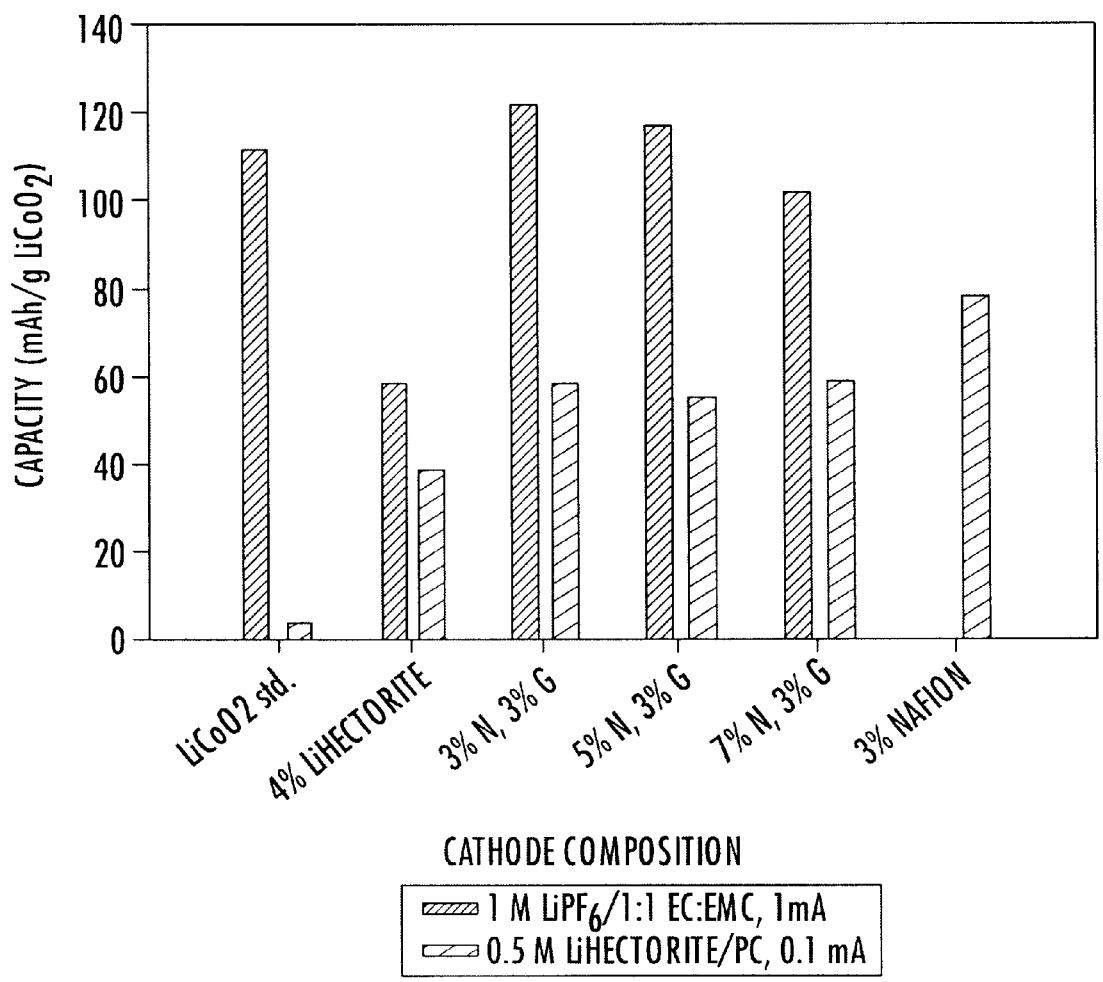
FIG. 8 illustrates lithium-ion half-cell capacities employing different hectorite and polymer materials.
Figure 9:
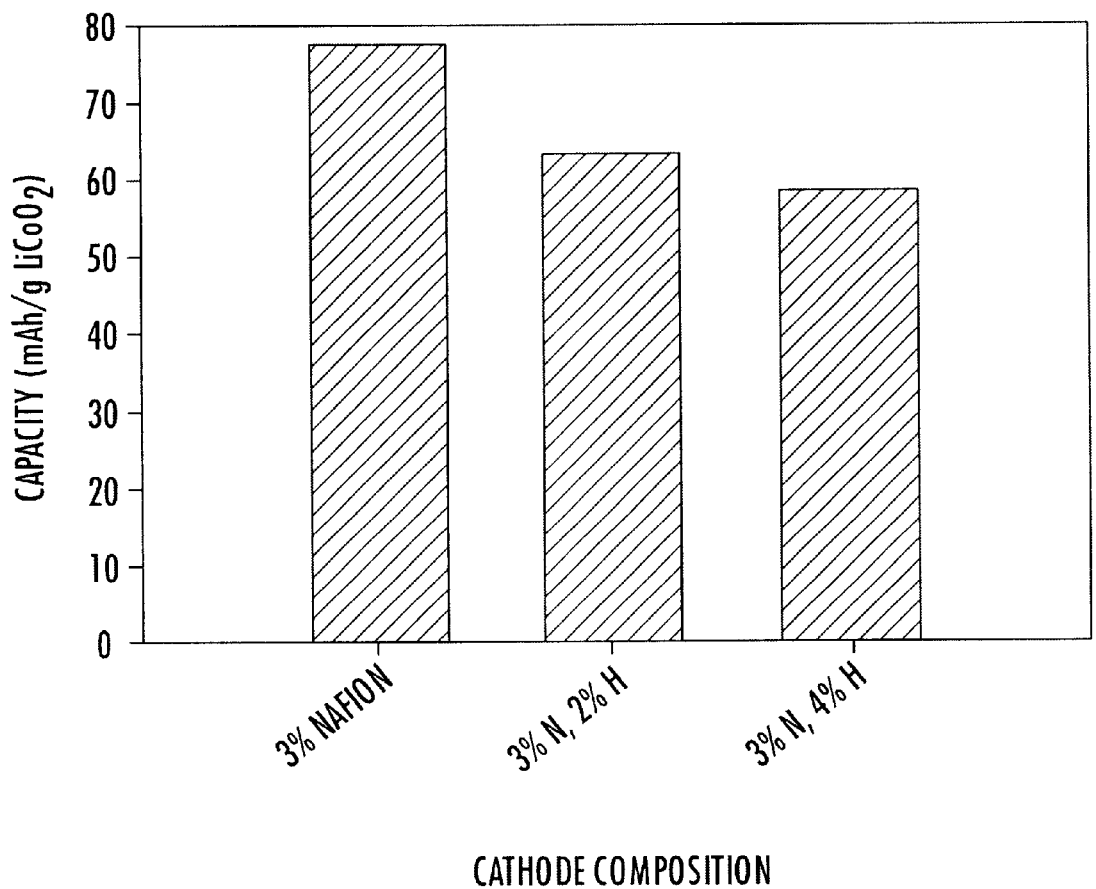
FIG. 9 illustrates lithium-ion half-cell capacities employing different hectorite and polymer materials.
Figure 10:
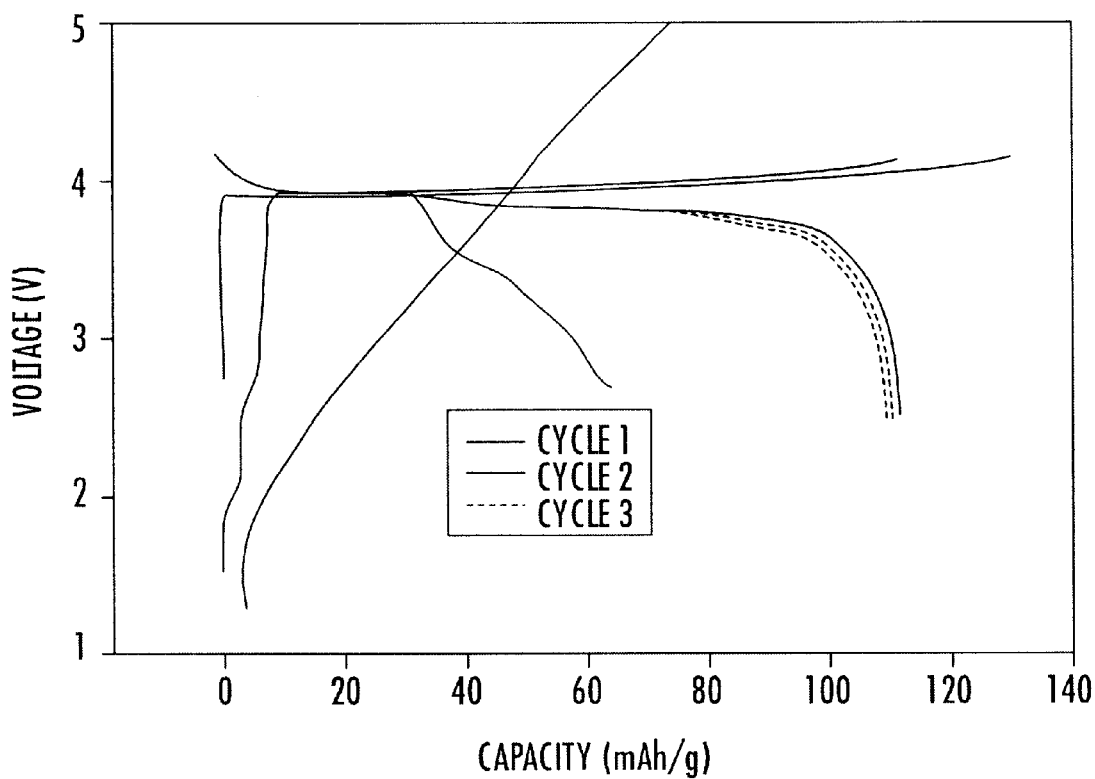
FIG. 10 illustrates Li/$LiCoO_2$ Charge-Discharge Curves for Three Cycles Using a Lithium Metal Anode/$LiCoO_2$ Cathode With a 1 M $LiPF_6$/1:1 EC:EMC electrolyte.
Figure 11:
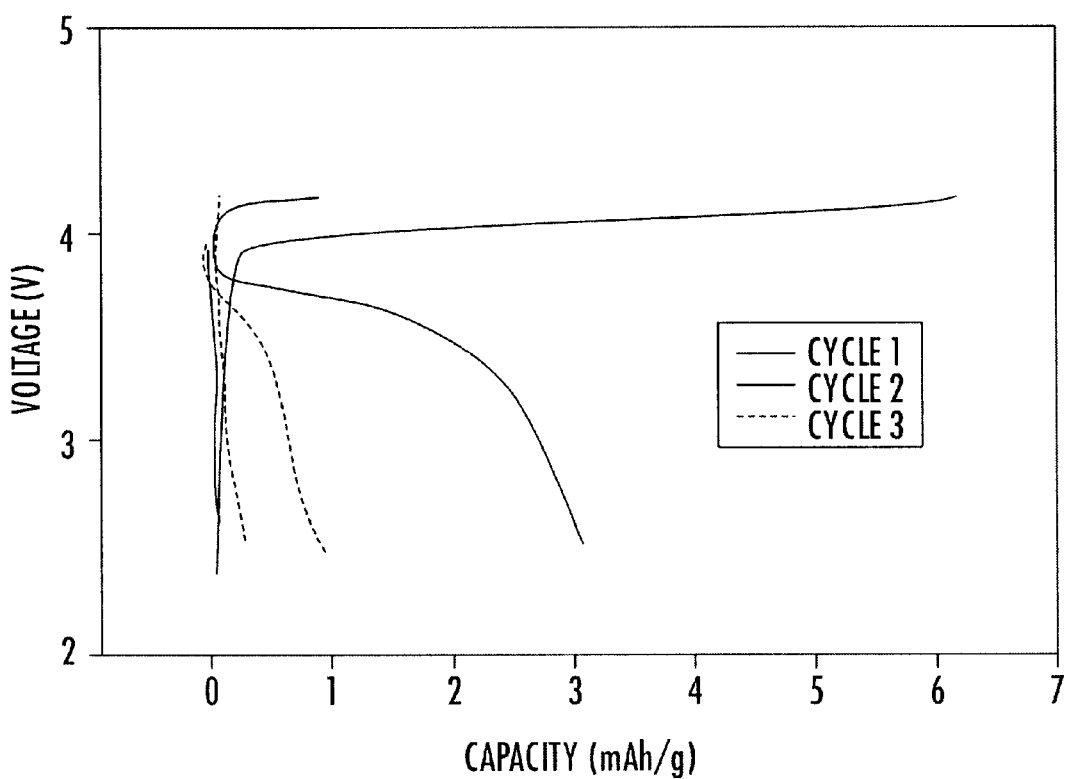
FIG. 11 illustrates Li/$LiCoO_2$ Charge-Discharge Curves for Three Cycles Using a 0.5 M LiHectorite/PC Composite Electrolyte.
Figure 12:
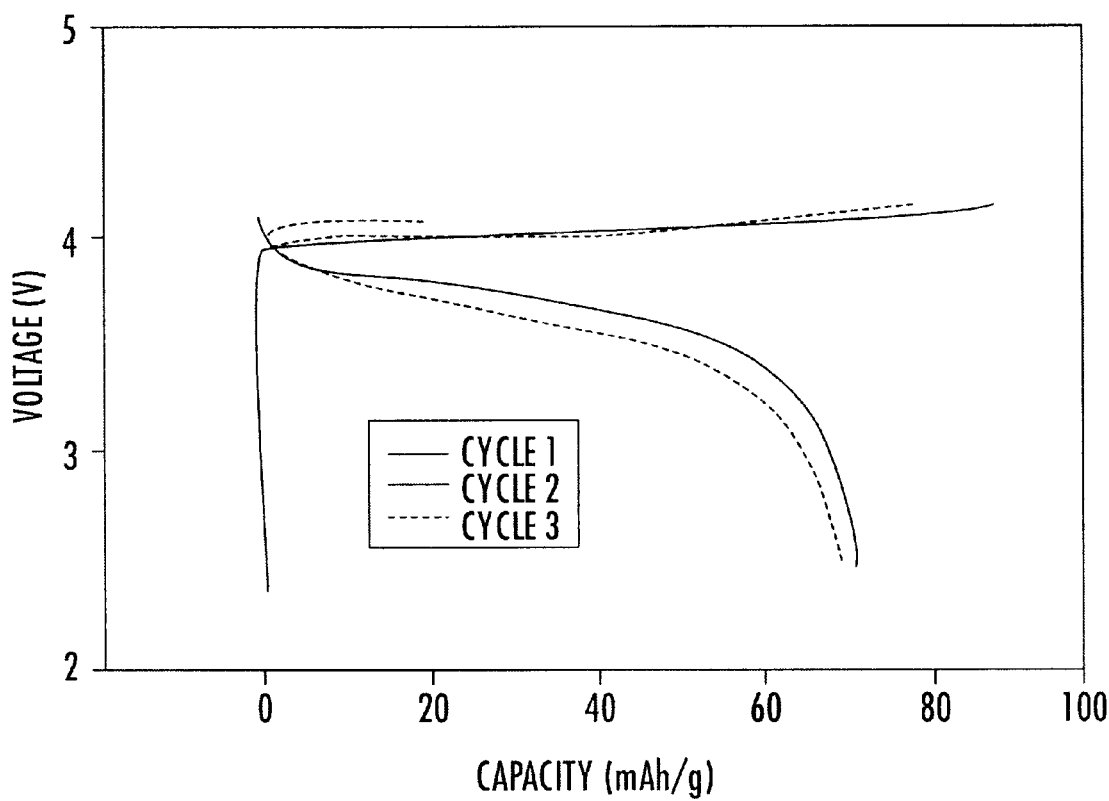
FIG. 12. illustrates Li/$LiCoO_2$ Charge-Discharge Curves for Two Cycles Using a 0.5 M LiHectorite Composite Electrolyte with 3 Weight Percent of Lithiated NAFION.
Figure 13:
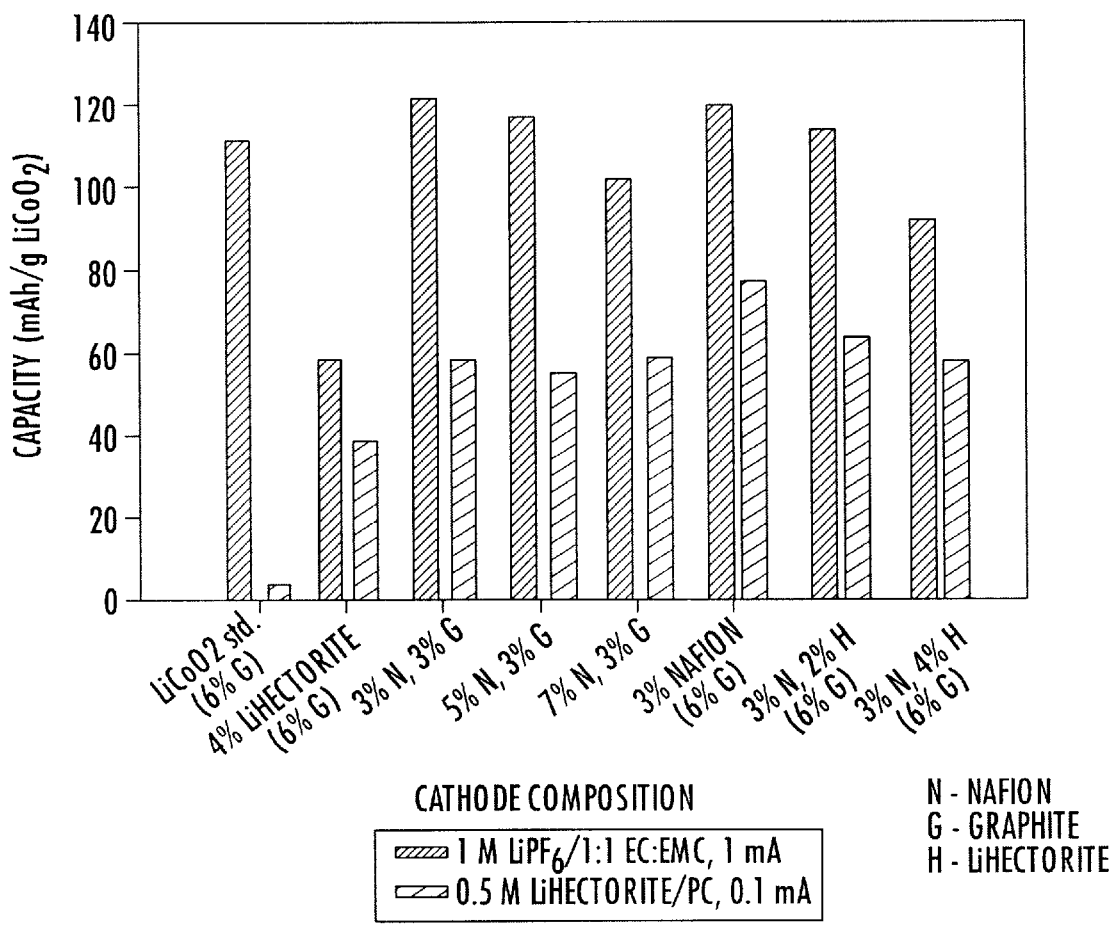
FIG. 13 illustrates lithium-ion half-cell capacities employing different hectorite and polymer materials.
Figure 14:
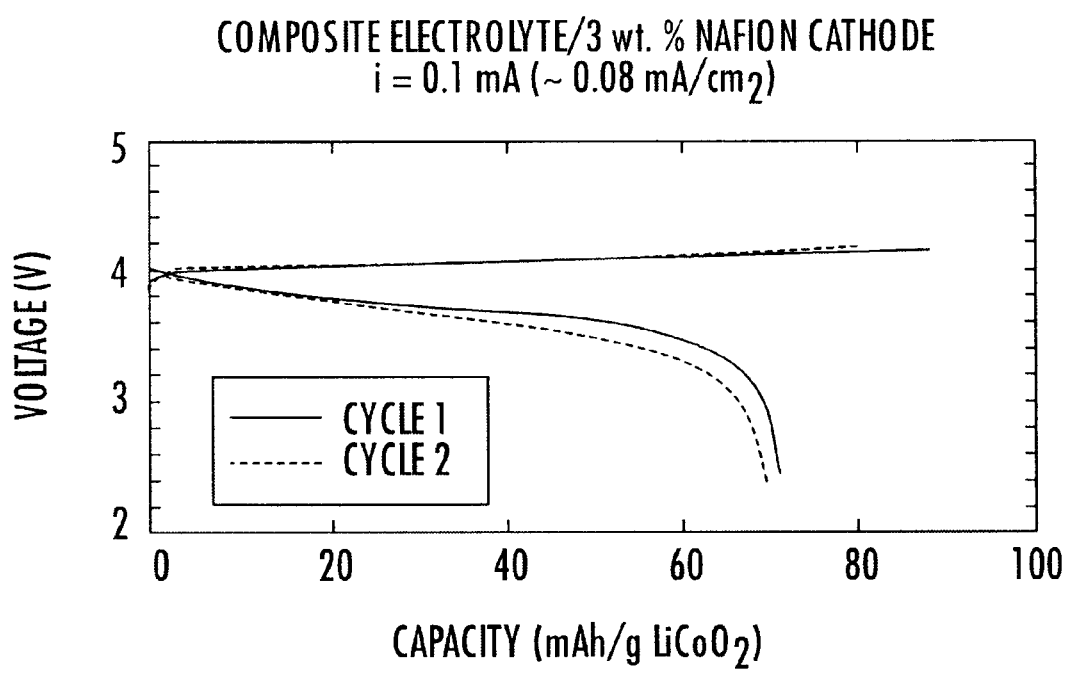
FIG. 14 illustrates the charge/discharge performance of a lithium-ion half-cell ($LiCoO_2$/lithium metal) with a 0.5 M LiHectorite, PC electrolyte.

Results according to the above examples are shown in FIGS. 6–14. FIG. 6 illustrates the effect of 4 weight percent of LiHectorite to a LiCoO₂ cathode on lithium-ion half-cell capacity. FIG. 7 illustrates the effect of Li-NAFION addition to a LiCoO₂ cathode on lithium-ion half-cell capacity. FIG. 8 illustrates lithium-ion half-cell capacities employing different hectorite and polymer materials. FIG. 9 illustrates lithium-ion half-cell capacities employing different hectorite and polymer materials. FIG. 10 illustrates Li/LiCoO₂ Charge-Discharge Curves for Three Cycles Using a Lithium Metal Anode/LiCoO₂ Cathode With a 1 M LiPF$_{6/1:1}$ EC:EMC electrolyte. FIG. 11 illustrates Li/LiCoO₂ Charge-Discharge Curves for Three Cycles Using a 0.5 M LiHectorite/PC Composite Electrolyte. FIG. 12 illustrates Li/LiCoO₂ Charge-Discharge Curves for Two Cycles Using a 0.5 M LiHectorite Composite Electrolyte with 3 Weight Percent of Lithiated Nafion. FIG. 13 illustrates lithium-ion half-cell capacities employing different hectorite and polymer materials. FIG. 14 illustrates the charge/discharge performance of a lithium-ion half-cell (LiCoO₂/lithium metal) with a 0.5 M LiHectorite, PC electrolyte.

Figure 15:
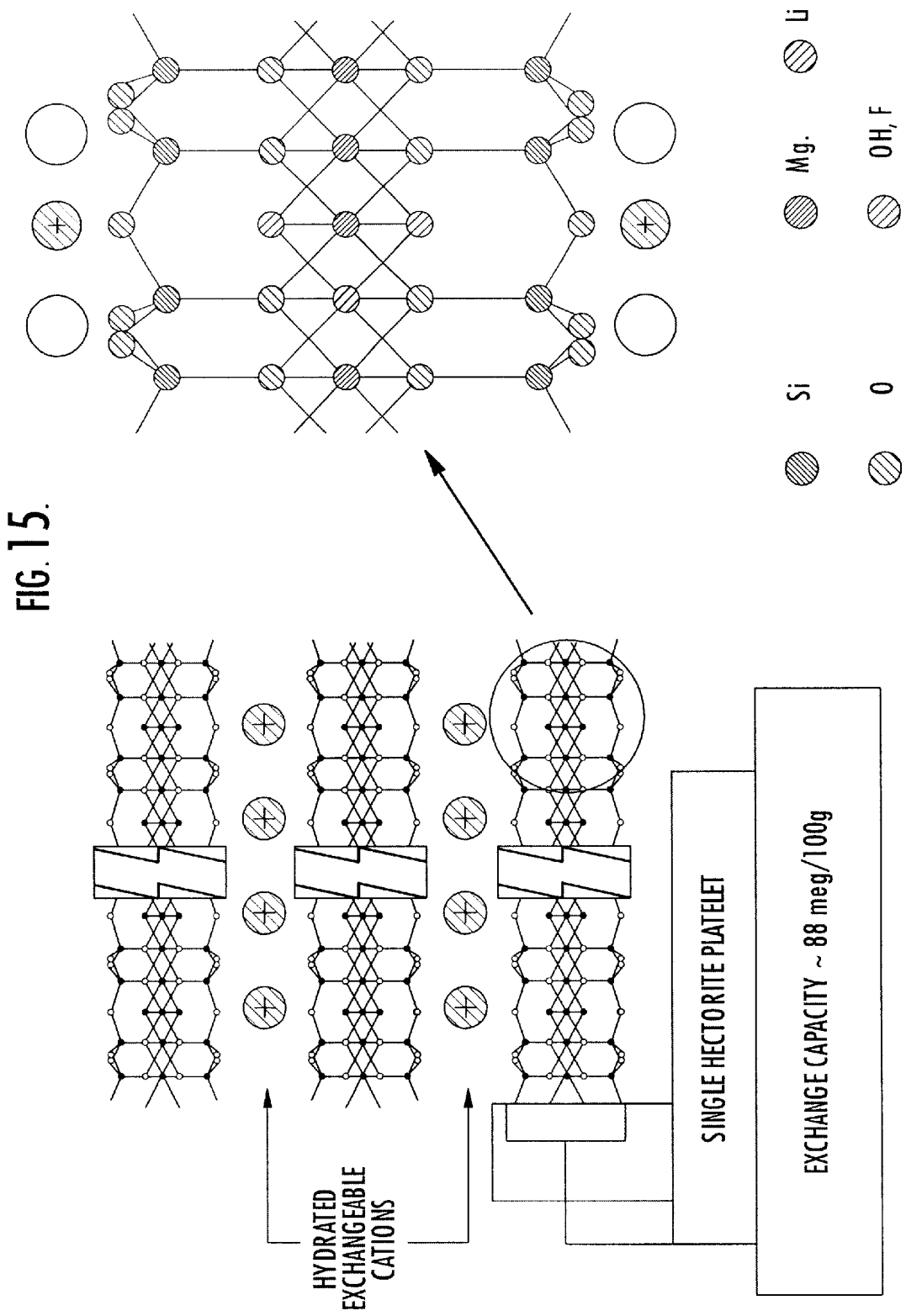
FIG. 15 illustrates a schematic diagram for hectorite platelets and exchangeable cations contained in a composite electrolyte according to the invention.
Figure 16:
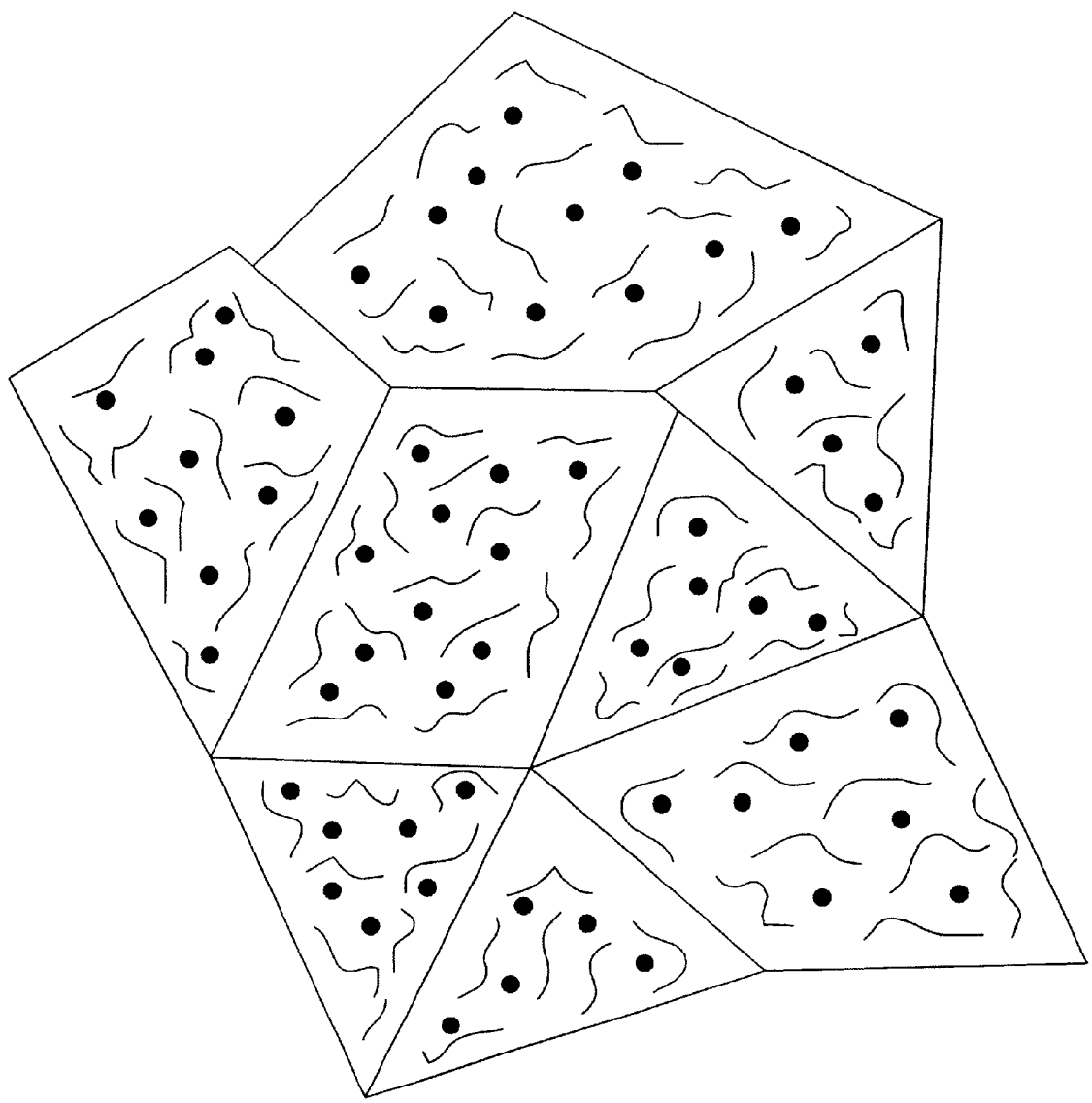
FIG. 16 illustrates a schematic diagram of a composite electrolyte according to the invention.

FIG. 15 is a schematic diagram for hectorite platelets and exchangeable cations contained in a composite electrolyte according to the invention. FIG. 16 is a schematic diagram of a composite electrolyte according to the invention showing a hectorite platelet structure that may be formed by face-to-face repulsion and edge-to-edge and/or edge-to-face attraction.

The invention is illustrated by reference to the above embodiments. It should be appreciated however that the invention is not limited to these embodiments but is instead defined by the claims that follow.

That which is claimed:

1. A composite electrolyte comprising:
    an inorganic clay material comprising a smectite clay and a dielectric solution having a dielectric constant ranging from about 50 to about 85;
    wherein the composite electrolyte has a cation transference number ranging from about 0.80 to about 1.00.

2. The composite electrolyte according to claim 1, further comprising a smectite platelet structure formed by face-to-face repulsion and edge-to-edge and/or edge-to-face attraction.

3. The composite electrolyte according to claim 1, wherein the smectite clay is selected from the group consisting of montmorillonite, saponite, and mixtures thereof.

4. The composite electrolyte according to claim 1, wherein the smectite clay is a hectorite.

5. The composite electrolyte according to claim 4, wherein the smectite clay is a lithium hectorite.

6. The composite electrolyte according to claim 1, wherein the composite electrolyte has an elastic modulus ranging from about $10^6$ dynes/cm$^2$ to about $10^8$ dynes/cm$^2$.

7. The composite electrolyte according to claim 1, wherein the composite electrolyte has a yield stress ranging from about $10^4$ dynes/cm$^2$ to about $10^6$ dynes/cm$^2$.

8. The composite electrolyte according to claim 1, wherein the composite electrolyte has a conductivity ranging from about $9 \times 10^{-5}$ S/cm to about $6 \times 10^{-4}$ S/cm.

9. The composite electrolyte according to claim 1, wherein the dielectric solution comprises a component selected from the group consisting of ethylene carbonate, propylene carbonate, dimethyl carbonate, n-n-dimethylacetamide, and mixtures thereof.

10. The composite electrolyte according to claim 1, wherein the composite electrolyte is essentially free of lithium salt.

11. An electrochemical cell comprising:
    an anode;
    a cathode; and
    interposed between said anode and said cathode, a composite electrolyte, wherein said composite electrolyte comprises anlinorganic clay material comprising smectite clay and a dielectric solution having a dielectric constant ranging from about 50 to about 85; wherein the composite electrolyte has a cation transference number ranging from about 0.80 to about 1.00.

12. The electrochemical cell according to claim 11, wherein the smectite claim is selected from the group consisting of montmorillonite, saponite, and mixtures thereof.

13. The electrochemical cell according to claim 11, wherein the smectite clay is a hectorite.

14. The electrochemical cell according to claim 13, wherein the smectite clay is a lithium hectorite.

15. The electrochemical cell according to claim 11, wherein the composite electrolyte has an elastic modulus ranging from about $10^6$ dynes/cm$^2$ to about $10^8$ dynes/cm$^2$.

16. The electrochemical cell according to claim 11, wherein the composite electrolyte has a yield stress ranging from about $10^4$ dynes/cm$^2$ to about $10^6$ dynes/cm$^2$.

17. The electrochemical cell according to claim 11, wherein the composite electrolyte has a conductivity ranging from about $9 \times 10^{-5}$ S/cm to about $6 \times 10^{-4}$ S/cm.

18. The electrochemical cell according to claim 11, wherein the dielectric solution comprises a component selected from the group consisting of ethylene carbonate, propylene carbonate, dimethyl carbonate, n-n-dimethylacetamide, and mixtures thereof.

19. The composite electrolyte according to claim 11, further comprising a smectite platelet structure formed by face-to-face repulsion and edge-to-edge and/or edge-to-face attraction.

20. The composite electrolyte according to claim 11, wherein the composite electrolyte is essentially free of lithium salt.

21. A battery comprising:
    an anode;
    a cathode; and
    interposed between said anode and said cathode, a composite electrolyte, wherein said composite electrolyte comprises an inorganic clay material comprising smectite clay and a dielectric solution having a dielectric constant ranging from about 50 to about 85; wherein the composite electrolyte has a cation transference number ranging from about 0.80 to about 1.00.

22. The battery according to claim 21, wherein the smectite clay is a hectorite.

23. The battery according to claim 22, wherein the smectite clay is a lithium hectorite.

24. The battery according to claim 21, wherein the composite electrolyte has an elastic modulus ranging from about $10^6$ dynes/cm$^2$ to about $10^8$ dynes/cm$^2$.

25. The battery according to claim 21, wherein the composite electrolyte has a yield stress ranging from about $10^4$ dynes/cm$^2$ to about $10^6$ dynes/cm$^2$.

26. The battery according to claim 21, wherein the composite electrolyte has a conductivity ranging from about $9 \times 10^{-5}$ S/cm to about $6 \times 10^4$ S/cm.

27. The battery according to claim 21, wherein the dielectric solution comprises a component selected from the group consisting of ethylene carbonate, propylene carbonate, dimethyl carbonate, n-n-dimethylacetamide, and mixtures thereof.

28. The battery according to claim 21, wherein the smectite clay is selected from the group consisting of montmorillonite, saponite, and mixtures thereof.

29. The composite electrolyte according to claim 21, further comprising a smectite platelet structure formed by face-to-face repulsion and edge-to-edge and/or edge-to-face attraction.

30. The composite electrolyte according to claim 21, wherein the composite electrolyte is essentially free of lithium salt.

* * * * *